United States Patent Office 3,267,820
Patented August 23, 1966

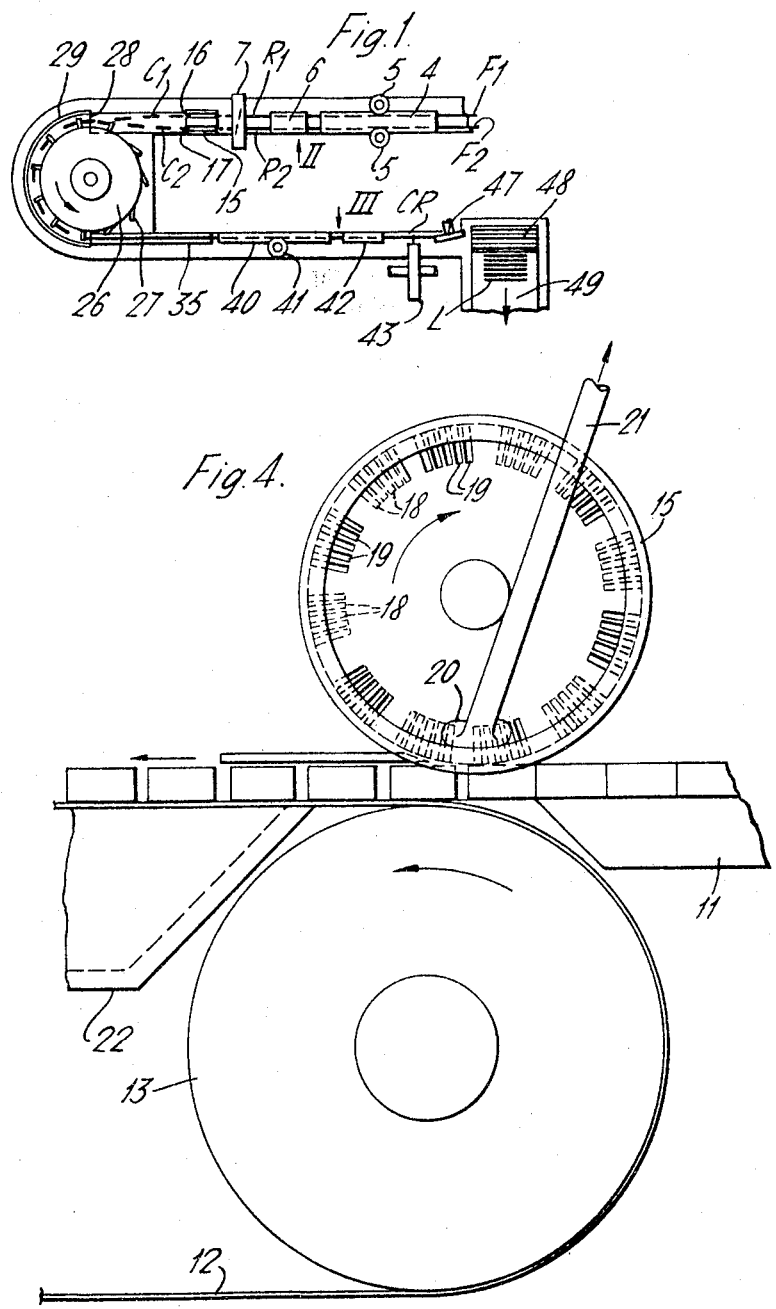

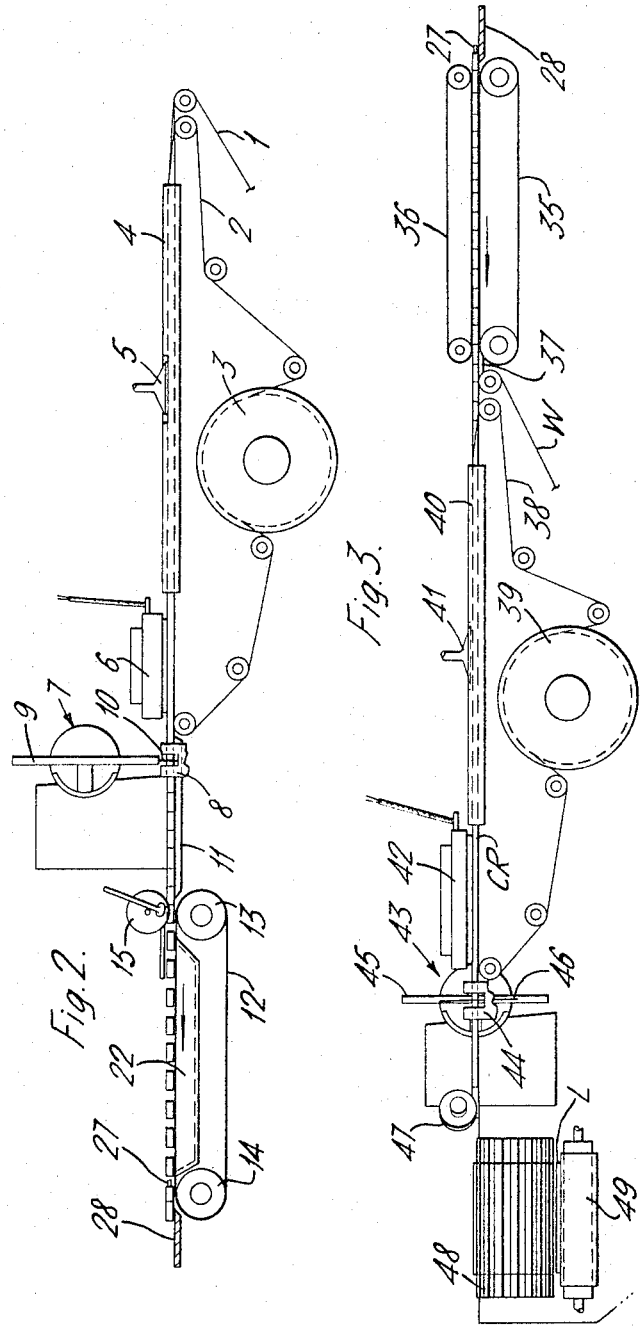

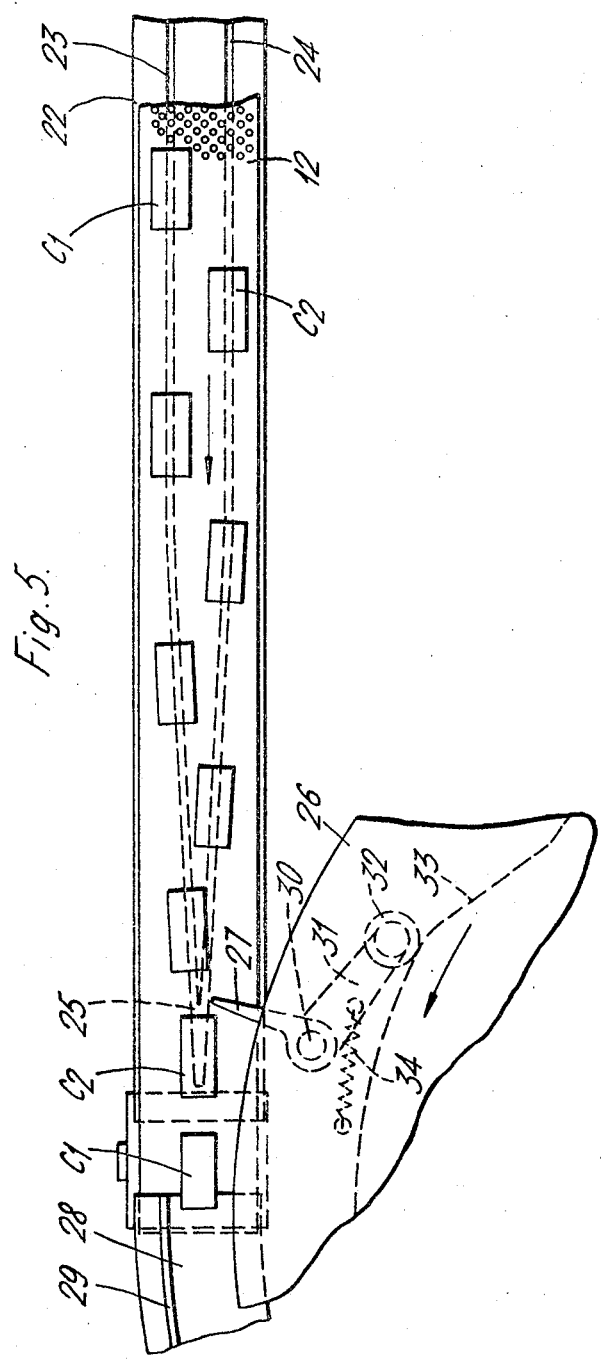

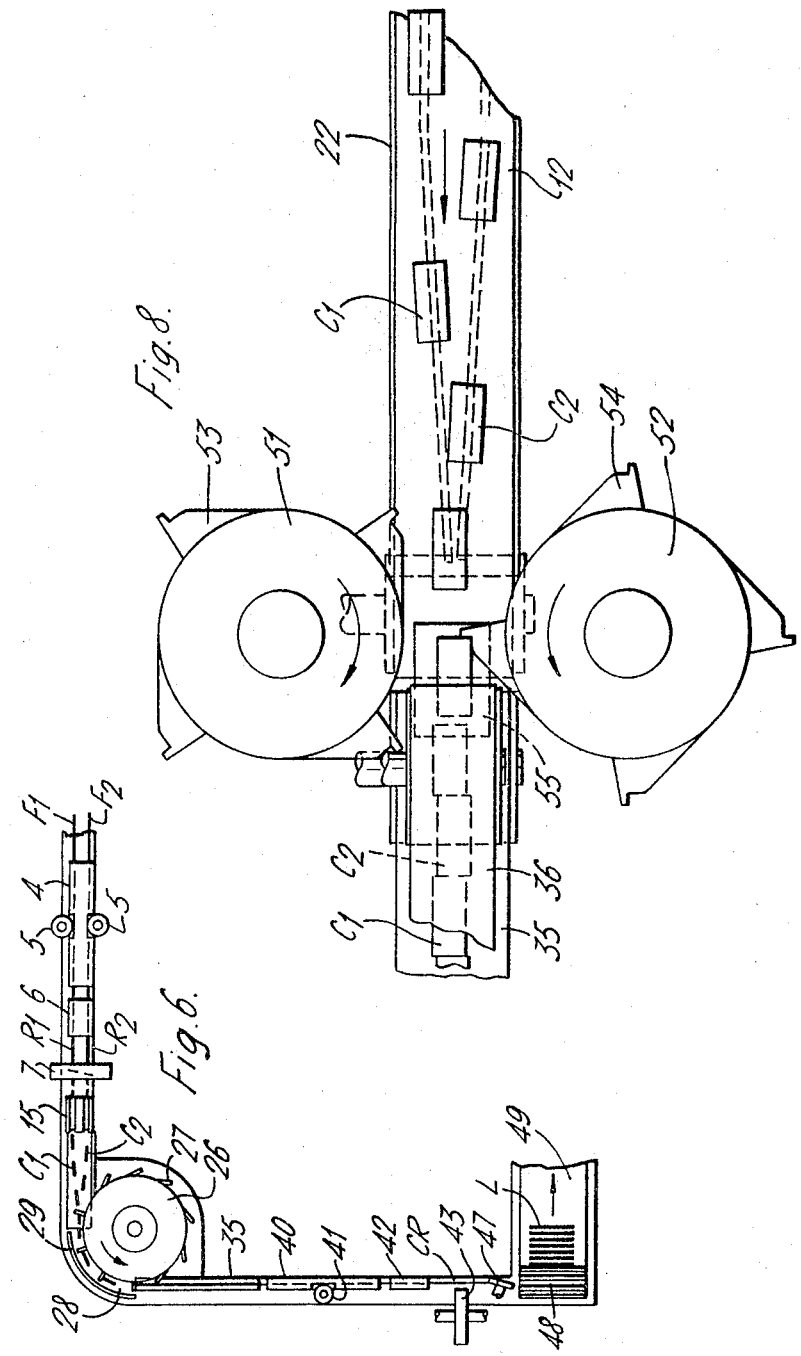

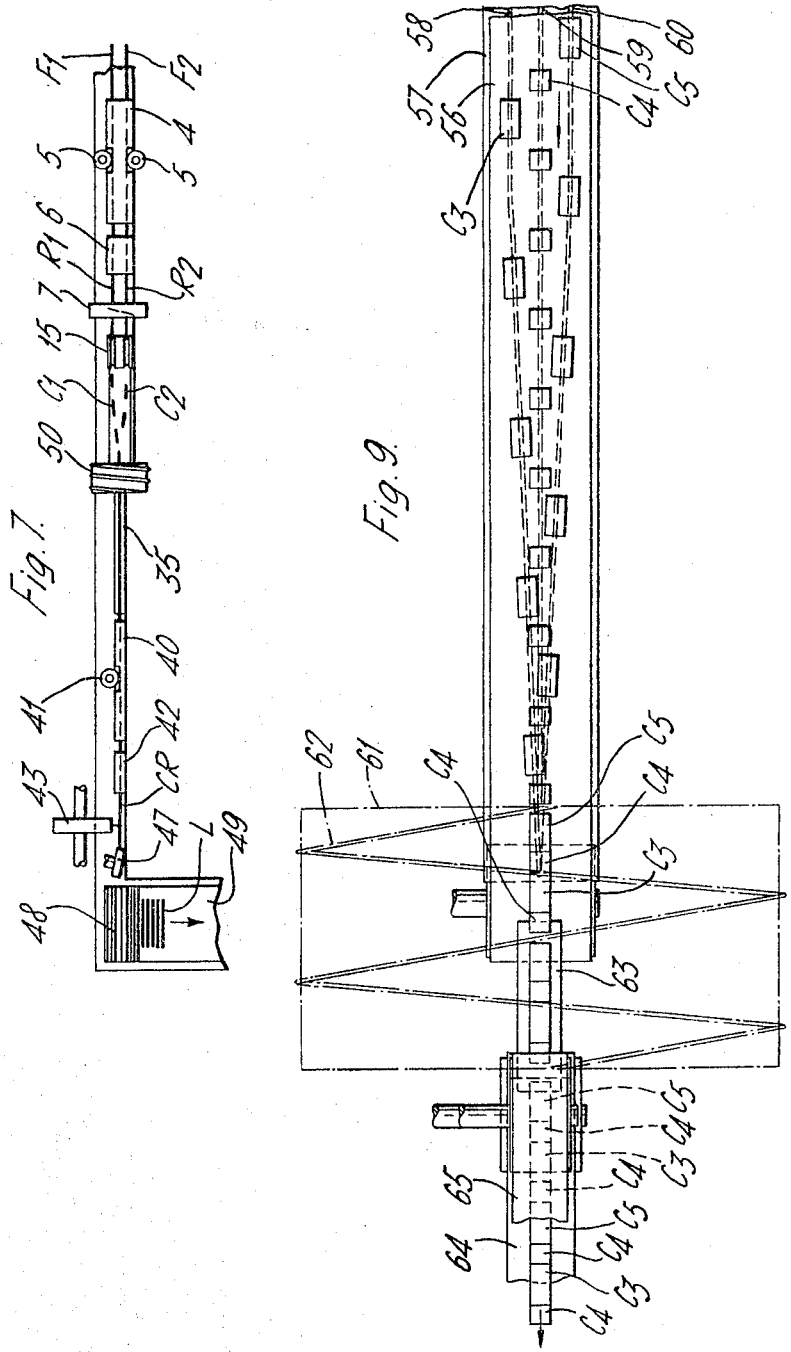

3,267,820
MANUFACTURE OF MOUTHPIECE
FOR CIGARETTES
Desmond Walter Molins and Tom Rowlands, Deptford, London, England, assignors to The Molins Organisation Limited
Filed Aug. 20, 1963, Ser. No. 303,297
Claims priority, application Great Britain, Sept. 5, 1962, 34,067/62
14 Claims. (Cl. 93—1)

This invention concerns improvements in or relating to the manufacture of a mouthpiece for cigarettes, and in particular to a method of an apparatus for making composite mouthpiece rod.

By the term "composite mouthpiece rod" is meant mouthpiece rod comprising different components arranged in axial alignment (whether in endwise abutment, or spaced apart endwise) and held together by an outer enclosing wrapper. By the term "component" is meant any portion of mouthpiece material suitable for incorporation in a mouthpiece rod. The term "mouthpiece material" when used herein is to be understood as meaning any material suitable for incorporation in the mouthpiece portion of a mouthpiece cigarette. A composite mouthpiece rod in which components are spaced apart endwise to provide a hollow portion in the rod will be referred to herein as a "hollow composite mouthpiece rod." For convenience a length of mouthpiece rod suitable for incorporation in an individual mouthpiece cigarette will be referred to herein as an "individual mouthpiece," and a portion of mouthpiece rod whose length is a multiple of that of an individual mouthpiece will be referred to herein as a "multiple length mouthpiece," while a portion of mouthpiece rod whose length is double that of an individual mouthpiece will be referred to as a "double length mouthpiece."

In the manufacture of composite mouthpiece rod for use in the production of a mouthpiece for cigarettes, it has been proposed to produce continuous rods of mouthpiece material and to sever therefrom lengths which are multiples of the length of the components required in the composite mouthpiece rod. These lengths are then fed to a machine which subdivides them to form the required components, and aligns and wraps the components to form a continuous composite mouthpiece rod, from which multiple length mouthpieces are severed. Examples of such proposals are described in U.S. Patent No. 2,957,285 dated Oct. 25, 1960, and U.S. Patent No. 3,118,454 dated Jan. 21, 1964 and U.S. Ser. No. 292,289, filed July 2, 1963, now abandoned. Thus each continuous rod of mouthpiece material is, in those proposals, produced and severed on one machine, and the composite mouthpiece rod produced on another machine.

According to the present invention there is provided a method of making composite mouthpiece rod comprising the steps of feeding lengthwise simultaneously a plurality of continuous rods of mouthpiece material, cutting each rod transversely of its length to sever components of a desired length therefrom, spacing apart endwise successive components severed from each rod, feeding the spaced components severed from the rods in timed relationship in such a way as to move the components into axial alignment with one another in a desired sequence, and wrapping the aligned components in a continuous wrapper to form a continuous composite mouthpiece rod. The components may be moved into axial alignment by being fed in convergent paths.

The method may further comprise the step of feeding lengthwise a filler of mouthpiece material, and wrapping the filler in a moving continuous wrapper to form a lengthwise moving continuous rod of mouthpiece material from which components are severed, and may comprise the step of simultaneously feeding lengthwise and wrapping a plurality of fillers of mouthpiece material to form a desired number (e.g. all) of the said plurality of continuous rods of mouthpiece material.

The method may comprise the step of cutting the continuous composite mouthpiece rod to sever desired lengths therefrom which may be a multiple of the length of an individual mouthpiece, and may be a multiple of the length of a double length mouthpiece.

Preferably the method includes the step of abutting the axially aligned components so that the continuous composite rod contains components arranged in endwise abutment, but, if desired, the method may also be used to make hollow composite mouthpiece rod, selected pairs of the axially aligned components being spaced apart endwise to provide the hollow portions.

The continuous rods of mouthpiece material may be fed in substantially parallel relationship, the components severed therefrom being then fed lengthwise in convergent paths. For example, two continuous rods of mouthpiece material may be fed lengthwise in substantially parallel relationship, successive components severed from each rod being spaced apart endwise by a distance at least equal to the length of the components severed from the other rod, and the spaced components from both rods being fed lengthwise in timed relationship in convergent paths so that a component severed from one rod becomes positioned between and in axial alignment with two spaced components severed from the other rod, and the composite mouthpiece rod so formed contains components from each rod in alternate arrangement. As a further example, three continuous rods of mouthpiece material may be fed lengthwise in substantially parallel arrangement, and the components severed therefrom may be spaced and moved into axial alignment so that, in the composite mouthpiece rod, a component severed from one rod is positioned between two components, severed one from each of the other two rods.

Further according to the present invention there is provided apparatus for making composite mouthpiece rod, comprising means to feed lengthwise simultaneously a plurality of continuous rods of mouthpiece material, cutting means to cut each rod transversely of its length to sever components of a desired length therefrom, means to space apart endwise successive components severed from each rod, means to feed the spaced components severed from the rods in timed relationship in such manner (e.g. in convergent paths) so as to move the components into axial alignment with one another in a desired sequence, and means to wrap the aligned components in a continuous wrapper to form a continuous composite mouthpiece rod.

The apparatus may further comprise means to feed lengthwise a filler of mouthpiece material, and means to wrap the filler in a moving continuous wrapper so as to form a lengthwise moving continuous rod of mouthpiece material from which components are severed, and may comprise means to feed lengthwise and means to wrap, simultaneously a plurality of fillers of mouthpiece material so as to form a desired number (e.g. all) of the said plurality of continuous rods of mouthpiece material.

The apparatus may comprise cutting means to sever desired lengths from the continuous composite mouthpiece rod.

Preferably the apparatus includes means to abut endwise the axially aligned components.

The continuous rods of mouthpiece material may be fed in substantially parallel relationship, and the said means to feed the components in convergent paths may comprise an air-pervious conveyor arranged to travel lengthwise over a series of laterally spaced slots which converge, in the direction of movement of the conveyor, towards a line running lengthwise of the conveyor, and means to apply suction through the slots, whereby the endwise spaced components can be carried on the conveyor so that the components severed from each rod register with each of the slots respectively, and are caused to move in convergent paths defined by the slots by the action of suction through the slots and through the conveyor, to move the components substantially into axial alignment on the said line.

Still further according to the present invention there is provided apparatus for moving components substantially into axial alignment in the manufacture of composite mouthpiece rod, comprising an air-pervious conveyor arranged to travel lengthwise over a series of laterally spaced slots which converge, in the direction of movement of the conveyor, towards a line running lengthwise of the conveyor, means to apply suction through the slots, and means to feed a plurality of series of components to the conveyor so that the components are carried lengthwise thereon with successive components in each series spaced apart endwise, and so that the components of each series register with each of the slots respectively, whereby the components are caused to move in convergent paths defined by the slots by the action of suction through the slots and through the conveyor, to move the components substantially into axial alignment on the said line.

Apparatus in accordance with the invention will now be described by way of example with reference to the accompanying drawings, in which:

FIGURE 1 is a schematic plan view of apparatus for making composite mouthpiece rod.

FIGURE 2 is a view looking in the direction of the arrow II in FIGURE 1, drawn to a larger scale.

FIGURE 3 is a view looking in the direction of the arrow III in FIGURE 1, drawn to a larger scale.

FIGURE 4 shows part of the apparatus in FIGURE 2 drawn to a larger scale.

FIGURE 5 is a plan view of part of the apparatus in FIGURE 2 drawn to a larger scale.

FIGURE 6 is a view similar to FIGURE 1 showing a yet further embodiment.

FIGURE 7 is a view similar to FIGURE 6 showing a yet further embodiment.

FIGURE 8 is a plan view of alternative apparatus for use in the embodiment shown in FIGURE 7.

FIGURE 9 is a plan view of apparatus for axially aligning components.

Referring to FIGURES 1, 2 and 3, two fillers $F_1$ and $F_2$ of different mouthpiece materials are fed lengthwise and deposited on lengthwise moving, continuous wrapper webs 1, which are conveyed on moving, endless conveyor tapes 2 moved by means of driving rollers 3. The tapes 2 carry the wrappers 1 through parallel garnitures 4, in which each wrapper is wrapped about its respective filler, adhesive being applied to one edge of the wrapper by a pasting wheel 5 and the wrapper being folded to enclose the filler in a known manner. The two continuous rods $R_1$ and $R_2$ of mouthpiece material thus formed then pass beneath a heater 6 to seal the rods.

The rods $R_1$ and $R_2$ then travel, in parallel relationship, to cut-off mechanism 7 which comprises a ledger 8 for each of the rods, and a single rotating knife 9 having a helical blade 10 which severs both rods. The knife 9 is adjustably mounted in a manner as described in United States application Ser. No. 68,559, filed Nov. 10, 1960, now Patent No. 3,140,632.

Components $C_1$ and $C_2$ are thus severed from the rods $R_1$ and $R_2$ respectively, the components being of a desired length and, in the present arrangement, the components $C_1$ being equal in length to the components $C_2$. The components then travel, in two parallel lines, over a bridge 11, FIGURE 2, to be received on an endless, air-pervious conveyor band 12 passing about rollers 13 and 14, and driven in the direction of the arrow in FIGURE 2. Positioned above the roller 13 is a rotating wheel 15 provided with two parallel peripheral grooves 16 and 17 (see FIGURE 1).

The wheel 15 is shown in greater detail in FIGURE 4. Each of the grooves 16 and 17 is provided with a series of groups of suction ports 18 and 19 respectively, five ports being shown in each group in FIGURE 4, and the groups being equispaced around the wheel. As can be seen from FIGURE 4, the groups of suction ports 18 which communicate with the groove 16 are offset from the groups of ports 19 which communicate with the groove 17. The ports 18 and 19 are open to atmosphere through the respective adjacent end faces of the wheel 15, and adjacent each end face near the lowest portion of the wheel's periphery is provided a stationary suction chamber 20, which is connected by a pipe 21 to a source of suction (not shown), with which chamber the suction ports can register.

The wheel 15 is rotated at a peripheral speed greater than the linear speed of the rods $R_1$ and $R_2$, so that the components $C_1$ are caused to move at the peripheral speed of the wheel by being suctionally held thereto in the groove 16 while a group of ports 18 register with the chamber 20. Successive components $C_1$ are thus spaced apart endwise by a distance greater than the length of the components $C_2$, and retained in spaced relationship on the band 12, the speed of the latter being equal to the peripheral speed of the wheel. Successive components $C_2$ are similarly spaced apart endwise by being held suctionally in the groove 17 on the wheel 15, and on account of the groups of suction ports 18 and 19 being offset around the wheel 15, the spaced components $C_1$ are offset lengthwise from the spaced components $C_2$.

Referring also to FIGURE 5, the conveyor band 12 is a perforated metal band, and passes over a hollow member 22 having two laterally spaced slots 23 and 24 which converge, in the direction of movement of the band 12, to a point 25 on a line running lengthwise of the band approximately half-way across its width. The endwise spaced components $C_1$ are received on the band 12 so that they register with the slot 23, and the components $C_2$ register similarly with the slot 24 as shown in FIGURE 5, the endwise spacing and lengthwise offsetting of the components also being clearly shown in that figure.

A source of suction (not shown) is connected to the interior of the member 22 so that suction is applied through the slots 23 and 24, and through the perforated band 12. The components $C_1$ and $C_2$ are conveyed lengthwise on the band and are caused to move (by rolling sideways on the band 12) in the convergent paths defined by the slots 23 and 24 respectively, by the action of suction therethrough. The components are thus moved substantially into axial alignment on the said line running centrally, length-wise of the band, a component $C_2$ moving to a position between two components $C_1$.

A wheel 26, provided with peripheral pusher elements 27, is rotated so that each successive component $C_2$ is engaged by a pusher 27 and moved thereby into endwise abutment with the preceding component $C_1$, the abutted pair of components then being conveyed by the pusher in an arcuate path over a plate 28 provided with a guide rail 29, and thus being turned through 180 degrees (see FIGURE 1).

As shown in FIGURE 5, each pusher element 27 is connected to the wheel 26 by a pivot 30 on which an arm 31 carrying a roller 32 is also mounted. A stationary cam 33 is provided adjacent the wheel 26 and the arm 31 is urged by a spring 34 so that the roller 32 follows the cam. The cam 33 is shaped so that each pusher element 27 is caused to protrude immediately before it engages a component $C_2$, and is retained in the protruding position (shown in FIGURE 5) whilst it is pushing the component, and so that the element 27 is retracted to disengage the component.

Referring now to FIGURE 3, the pairs of components $C_1$ and $C_2$ are pushed from the plate 28 by the pushers 27 to be received on an endless conveyor band 35 which is driven to move at a speed less than the linear speed of the components pushed by the pushers 27. Above the band 35 is a further endless band 36 which is driven to move at the same speed as the band 35. The endwise spaced pairs of components are abutted as they are received between the upper run of the band 35 and the lower run of the band 36 on account of the greater speed of the components relative to the bands, each pusher element 27 being retracted after the leading component $C_1$ of the pair of components pushed thereby abuts the preceding component $C_2$.

The lengthwise moving stream of endwise abutted components, arranged substantially in axial alignment, then passes over a bridge 37 to be received on a moving continuous wrapper web W, which is carried on an endless conveyor tape 38 passing over a driving roller 39 and moving at the same speed as the bands 35 and 36. The tape 38 travels through a garniture 40 in which the web W is wrapped about the components, which are moved into correct axial alignment as they travel through the garniture. Adhesive is applied to one edge of the web by a pasting wheel 41, and the web is folded to enclose the components in a known manner. The continuous composite mouthpiece rod C.R. so formed then passes beneath a heater 42 to seal the rod.

The rod C.R. then passes to cut-off mechanism 43, comprising a ledger 44 and a rotatable knife 45 having a helical blade 46, the knife being adjustably mounted in the same manner as the knife 9 in the cut-off 7 previously described. The cut-off 43 acts in timed relationship with the feed of the rod C.R. to sever desired lengths L therefrom, each length being a multiple of the length of a double length mouthpiece, and the rod being cut centrally through a component as described in U.S. Patent No. 3,118,454.

The severed lengths L are then transferred by means of a rotating, grooved suction wheel 47 to a fluted drum 48 in a manner described in U.S. Patent No. 3,039,589, dated June 19, 1962, in which the construction of the wheel 47 is also described. The lengths L are delivered from the drum 48 to a moving catcher band 49 on which they form an endwise aligned row (see FIGURE 1).

The embodiment shown in FIGURE 6 comprises the same apparatus as the embodiment shown in FIGURE 1, but the pusher wheel 26 is arranged to move the components through 90 degrees. The construction and operation of the parts are as described with reference to FIGURES 1, 2, 3, 4 and 5 so that further description is unnecessary.

FIGURE 7 shows a further embodiment in which the composite mouthpiece rod C.R. travels in a line parallel to that of the rods $R_1$ and $R_2$ of mouthpiece material and is fed in the same direction. In this embodiment the pusher wheel 26 is replaced by a single-thread worm wheel 50 which abuts pairs of components $C_1$ and $C_2$ and pushes them across a bridge to be received on the conveyor band 35. The construction and operation of the worm wheel are described in U.S. Patent No. 3,118,454. The construction and operation of the other parts shown in FIGURE 7 are as previously described.

FIGURE 8 shows alternative apparatus for use in place of the worm wheel 50 shown in FIGURE 7. This alternative apparatus comprises two rotatable pusher wheels 51 and 52, provided with pusher elements 53 and 54 respectively. The pusher wheels are located one on either side of the air pervious conveyor band 12 adjacent its downstream end. The components $C_1$ and $C_2$ are alternately engaged by the pushers 53 and 54 respectively, and pushed thereby from the band 12 across a bridge 55 to be received between the bands 35 and 36. In FIGURE 8 the components travelling between the bands 35 and 36 are shown slightly out of axial alignment, and, as previously stated, the components are correctly aligned as they pass through the garniture 40.

The multiple length mouthpiece L received on the catcher band 49 can be taken therefrom to be used in the manufacture of cigarettes having composite mouthpieces. The manner in which the length L is severed to produce individual mouthpieces is described in U.S. Patent No. 3,118,454.

It will be appreciated that, if desired, a method and apparatus according to the present invention could be used to make hollow composite mouthpiece rod, successive components being spaced apart endwise when they are wrapped to provide hollow portions in the rod. For example, in the apparatus shown in FIGURE 7, the worm wheel 50 could be used to effect a desired endwise spacing of components in a manner as described in the last mentioned patent.

It will further be appreciated that, if desired, the rods $R_1$ and $R_2$ of mouthpiece material could be pre-formed and fed directly to the cut-off 7, for example from spools.

FIGURE 9 shows apparatus similar to part of that shown in FIGURE 7 for axially aligning components. In this case three series of components $C_3$, $C_4$ and $C_5$, which have been severed from three separate continuous rods of mouthpiece material, are moved to form one line of axially aligned components. The components are received on an air pervious conveyor band 56, similar to the band 12 previously described, which passes over a member 57 which is similar to the member 22 but is provided with three laterally spaced slots 58, 59 and 60. The slot 59 runs centrally, lengthwise of the band 56, and the slots 58 and 60 converge in the direction of movement of the band to the line of the slot 59. Suction is applied through the slots, and the three series of components $C_3$, $C_4$ and $C_5$ are fed to the band, the components in each series having been spaced apart endwise in a manner previously described so that the distance between two successive components $C_3$ is greater than the combined lengths of two components $C_4$ and one component $C_5$, the distance between two successive components $C_4$ is greater than the length of a component $C_3$ or $C_5$ (which have the same length), and the distance between successive components $C_5$ is the same as that between successive components $C_3$. As can be seen in FIGURE 9, the components in each series are offset lengthwise from the components in each of the other series.

The series of components $C_3$, $C_4$ and $C_5$ register with the slots 58, 59 and 60 respectively, and as the band 56 travels over the member 57, the components are caused to move in convergent paths defined by the slots by the action of suction therethrough, and are moved substantially into axial alignment on the line of the slot 59.

A rotating worm wheel 61, similar to the worm wheel 50, with a single thread 62, then abuts endwise groups of four components, each group comprising a leading component $C_4$ followed by components $C_3$, $C_4$ and $C_5$ in that order, and pushes the groups across a bridge 63 to be received between moving bands 64 and 65, similar to the bands 35 and 36.

The groups of components are abutted endwise as they are received between the bands 64 and 65, and the axially aligned components then pass through a garniture to be wrapped to form a continuous composite mouthpiece rod, and the rod then passes to a cut-off as previously described.

As can be seen from FIGURE 9, the composite rod formed by this arrangement contains alternate components $C_4$ positioned between a component $C_3$ and a component $C_5$. The manner in which multiple length mouthpieces are severed from the continuous composite rod, and the manner in which these are subdivided to ultimately form individual mouthpieces are described in co-pending United States Ser. No. 292,289 filed July 2, 1963.

What we claim as our invention and desire to secure by Letters Patent is:

1. A method of making composite mouthpiece rod comprising the steps of simultaneously feeding lengthwise a plurality of continuous rods of mouthpiece material, cutting each rod transversely of its length to sever components of a desired length therefrom, spacing apart endwise successive components severed from each rod, feeding the spaced components in timed relationship and in such a way as to move the components into axial alignment with one another in a desired sequence, and wrapping the aligned components in a continuous wrapper to form a continuous composite mouthpiece rod.

2. A method as claimed in claim 1, further comprising the initial step of feeding lengthwise at least one filler of mouthpiece material and wrapping each such filler in a moving continuous wrapper to form at least one of the rods of mouthpiece material from which components are severed.

3. A method as claimed in claim 1, including the final step of cutting the continuous composite mouthpiece rod to sever desired lengths therefrom.

4. A method as claimed in claim 1, including the step of abutting the axially aligned components so that the continuous composite mouthpiece rod contains components arrange in endwise abutment.

5. A method as claimed in claim 1, in which the continuous rods of mouthpiece material are fed in substantially parallel relationship and the components severed therefrom fed lengthwise in convergent paths.

6. A method of making composite mouthpiece rod comprising the steps of simultaneously feeding lengthwise two rods of mouthpiece material, cutting each rod transversely of is length to sever components of a desired length therefrom, spacing endwise successive components severed from each rod by a distance at least equal to the length of component severed from the other rod, feeding the spaced components from the two rods lengthwise along convergent paths in such timed relationship that each component from one rod becomes positioned between and in axial alignment with two spaced components from the other rod, and wrapping the aligned components in a continuous wrapper to form a continuous composite mouthpiece rod.

7. Apparatus for making composite mouthpiece rod comprising, in combination, means for simultaneously feeding lengthwise a plurality of continuous rods of mouthpiece material, cutting means arranged to cut each of said rods transversely of its length to sever components of a desired length therefrom, means to space apart endwise successive components severed from each rod, means to feed the spaced components in timed relationship and in such manner as to move the components into axial alignment with one another in a desired sequence, and means to wrap the aligned components in a continuous wrapper to form a continuous composite mouthpiece rod.

8. Apparatus as claimed in claim 7, in which the means for feeding the spaced components is so arranged that components severed from different ones of the rods travel along converging paths.

9. Apparatus as claimed in claim 7, including means for feeding lengthwise at least one filler of mouthpiece material and wrapping each such filler in a moving continuous wrapper to form one of the lengthwise moving continuous rods of mouthpiece material from which components are severed.

10. Apparatus as claimed in claim 7, including cutting means to sever desired lengths from the continuous composite mouthpiece rod.

11. Apparatus as claimed in claim 7, including means to abut endwise the axially aligned components.

12. Apparatus as claimed in claim 7, in which the means to space apart successive components severed from each rod comprises a rotatable wheel so disposed that the path of components severed from the corresponding rod is tangential to its circumference, said wheel having a plurality of ports in its circumference, means for rotating said wheel, means for applying suction to each of said ports as the latter passes through a region near the path of the components so that as each port enters said region the application of suction thereto causes a component to be held against the circumference of the wheel at the position of the port and travel with said wheel until the port leaves said region, and a conveyor belt placed to receive components released from the ports of said wheel as said ports leave said region, so that components reach said belt at spaced intervals determined by the spacing of said ports around said wheel.

13. Apparatus as claimed in claim 12 in which said conveyor is an air-pervious conveyor, and including means to apply suction through said conveyor to retain components thereon.

14. In apparatus for making composite mouthpiece rod, apparatus for moving components substantially into axial alignment comprising an air-pervious conveyor arranged to travel lengthwise over a series of laterally spaced slots which converge, in the direction of movement of the conveyor, towards a line extending lengthwise of said conveyor, means to apply suction through the slots, and means to feed a plurality of series of components to the conveyor so that the components are carried lengthwise thereon with successive components in each series spaced apart endwise and so that the components of each series register with each of the slots respectively, whereby the components are caused to move in convergent paths defined by the slots by the action of suction through the slots and through the conveyor to move the components substantially into axial alignment on the said line.

References Cited by the Examiner
UNITED STATES PATENTS 2,953,878  9/1960   Schur.
3,058,475  10/1962  Gamberini _____ 131—94
3,064,541  11/1962  Mantchev _____ 93—1

BERNARD STICKNEY, *Primary Examiner.*